United States Patent [19]

Wamprecht et al.

[11] Patent Number: 4,837,273

[45] Date of Patent: Jun. 6, 1989

[54] LACQUER BINDER CONTAINING GRAFT COPOLYMER AND POLYISOCYANATES

[75] Inventors: Christian Wamprecht, Krefeld; Manfred Schönfelder, Leverkusen; Peter Höhlein, Kempen; Lothar Kahl, Bergisch-Gladbach, all of Fed. Rep. of Germany

[73] Assignee: Bayer Aktiengesellschaft, Leverkusen, Fed. Rep. of Germany

[21] Appl. No.: 153,236

[22] Filed: Feb. 8, 1988

[30] Foreign Application Priority Data

Feb. 18, 1987 [DE] Fed. Rep. of Germany ....... 3705090

[51] Int. Cl.$^4$ .................. C08L 51/00; C08L 75/00
[52] U.S. Cl. ........................ 525/66; 525/64; 525/65; 525/68; 525/123; 525/124; 525/127
[58] Field of Search ................ 525/66, 68, 518, 123, 525/65, 124, 127

[56] References Cited

U.S. PATENT DOCUMENTS 3,856,883 12/1974 Dickie et al. .................. 525/66

Primary Examiner—Theodore E. Pertilla
Attorney, Agent, or Firm—Connolly and Hutz

[57] ABSTRACT

The present invention relates to new binder combinations comprising (A) 99–30 parts by weight of OH-functional graft copolymer resins prepared by copolymerization of a polybutadiene having a molecular weight of from 500 to 10000 and containing more than 30% of 1,2-vinyl structure with selected olefinically unsaturated monomers and (B) 1 to 70 parts by weight of a multifunctional crosslinking resin, preferably a polyisocyanate resin. The new binder combinations are suitable for preparing coatings having a very high level of elasticity and an excellent surface hardness.

10 Claims, No Drawings

LACQUER BINDER CONTAINING GRAFT COPOLYMER AND POLYISOCYANATES

BACKGROUND OF THE INVENTION

This invention relates to new binder combinations comprising OH-functional graft copolymer resins and multi-functional crosslinking resins, preferably polyisocyanate resins.

The binders according to this invention are suitable, for example, for use in the motor vehicle sector, especially for coating parts which are exposed to severe impact and bending stresses and severe weathering conditions.

It is known that the properties of plastics may be improved to such an extent by means of lacquering that they become suitable for use in special applications. If, for example, parts made of plastics for the motor vehicle industry are to be used in situations where they are exceptionally exposed to weathering, impacts and environmental influences as, for example, in the region of the lower side parts (sills) and the front and rear parts, these parts must be covered with coatings which have high flexibility and surface hardness.

Plastics surfaces which are particularly exposed to road dirt (sills) must be protected by coatings which not only have the necessary mechanical resistance (resistance to stone chipping) but also a high resistance to salt, fuels, and tar and oil stains. All the coatings must have good optical characteristics as films so that they not only have a high degree of gloss but also retain these optical properties over a period of many years in spite of the influence of weathering.

It is known from DE-OS No. 2 364 736 to coat rubber products with an acrylic lacquer based on styrene, alkyl (meth) acrylic acid esters and hydroxy alkyls (meth) acrylic acid esters in combination with alkylated melamine-formaldehyde resins or polyisocyanates. The highly flexible coatings thus obtained are not always entirely satisfactory, for example in their mechanical properties, in the adherence of the coating to the plastic surface, etc.

Before the rubber surface is coated, it must be surface activated and then primed with two coats of acrylic resin as the coatings only manifest their special properties on pre-treated surfaces of rubber such as an ethylene-propylene copolymer rubber, a styrene-butadiene copolymer rubber, a polybutadiene rubber, a polyisoprene rubber or a butyl rubber.

Films based on polyacrylates which can be coated with a reactive lacquer system based on polyols/polyisocyanate without requiring a preliminary treatment and without problems of adherence are disclosed in DE-OS No. 2 756 708. The elimination of problems of adherence is achieved by adding to the copolymers from 1 to 15% by weight of monomers with functional end groups which are capable of forming a bond with the isocyanate-based reactive lacquer system. Although this process has the advantage of eliminating the special preliminary treatment of the substrate surface, it has the disadvantage that it is only applicable to the special case of films on (meth) acrylate copolymers and cannot be used for coating substrate surfaces based on other polymers.

It has now been found that binder combinations of OH-functional graft copolymer resins and polyisocyanates form firmly adhering films on surfaces which have not been pre-treated, preferably metal or plastics surfaces, after they have been cured. Their excellent overall properties such as elasticity, hardness, chemical resistance and weathering resistance enables them to be used e.g. in the construction of motor vehicles by the composite construction method or for the construction of windows, household implements, etc.

SUMMARY OF THE INVENTION

The present invention relates to binder combinations comprising
(A) 99–30 parts by weight, preferably 90–30 parts by weight, of OH-functional graft copolymer resins prepared by the copolymerisation of
  (a) 1–60 parts by weight of at least one, optionally functional polybutadiene having a molecular weight of from 500 to 10,000 and containing more than 30% of a 1,2-vinyl structure,
  (b) 5–60 parts by weight of at least one unsaturated aromatic monomer such as styrene, vinyl toluene and/or methacrylic acid ester containing aliphatic $C_1$–$C_6$ hydrocarbon groups, preferably methylmethacrylate,
  (c) 5–80 parts by weight of at least one aliphatic acrylic acid ester having 1–12 carbon atoms in the alcohol component, preferably butyl acrylate and 2-ethyl-hexyl acrylate,
  (d) 10–60 parts by weight of at least one hydroxy alkyl ester of acrylic or methacrylic acid having 2–8 carbon atoms in the hydroxy alkyl group,
  (e) 0–50 parts by weight of at least one acrylic or methacrylic acid glycidyl ester or reaction products thereof with aliphatic and/or aromatic monocarboxylic acids and amino compounds,
  (f) 0–30 parts by weight of acrylonitrile, and
  (g) 0.05–10 parts by weight of at least one $\alpha,\beta$-monoolefinically unsaturated mono or dicarboxylic acid having 3–7 carbon atoms and/or at least one maleic or fumaric acid semi ester having 2–14 carbon atoms in the alcohol group, preferably acrylic acid, and
(B) 1–70 parts by weight, preferably 10–70 parts by weight of a multifunctional crosslinking resin, in particular aminoplast resins such as alkoxylated melamine resins, melamine-formaldehyde condensation products, urea resins, guanidine resins, phenoplast resins or resol resins and, preferably, polyfunctional isocyanates, especially oligomeric isocyanates having a biuret, allophanate, urethane and/or isocyanurate structure, the sum of parts by weight of components (A) and (B) and the sum of parts by weight of components (a) to (g) amounting in each case to 100.

DETAILED DESCRIPTION OF THE INVENTION

Preparation of the graft copolymer resins A may be carried out by copolymerisation of the components a–g by conventional processes. Radical polymerisation, either solvent free or in solution, is preferred. In this process, monomeric and oligomeric components are copolymerised at temperatures of from 70° to 160° C. in the presence of radical formers and optionally molecular weight regulators.

Preferred starting compounds for the polyacrylate resins A consist of the following components:
(a) 1–55 parts by weight of one or more, optionally functional polybutadienes having a molecular weight of from 500 to 10,000 and containing more than 35% of a 1,2-vinyl structure,
(b) 5–55 parts by weight of styrene, vinyl, toluene, methyl methacrylate, butyl methacrylate or mixtures thereof,
(c) 5–75 parts by weight of ethylacrylate, butylacrylate, 2-ethyl-hexylacrylate or mixtures thereof,
(d) 10–55 parts by weight of 2-hydroxyethyl acrylate, 2-hydroxypropylacrylate, 4-hydroxybutylacrylate, 2-hydroxyethylmethacrylate, 2-hydroxypropylmethacrylate or mixtures thereof,
(e) 0–45 parts by weight of glycidyl acrylate, glycidylmethacrylate or mixtures thereof, optionally after a reaction with saturated and/or unsaturated aliphatic and/or aromatic monocarboxylic acids, which reaction is carried out before or, preferably, after copolymerisation at temperatures of 80° to 160° C., using conventional catalysts,
(f) 0–25 parts by weight of acrylonitrile, and
(g) 0.1 to 8 parts by weight of acrylic acid, methacrylic acid or maleic acid semi esters having 4–8 carbon atoms in the alcohol component, or mixtures thereof.

Any polybutadienes containing 1,2-vinyl double bonds in side positions are suitable in principle as starting materials (a) for the graft copolymer resins according to the invention.

Polybutadienes containing more than 30% of vinyl double bonds are particularly suitable. The other double bonds may be composed of any proportions of cis 1,4- and trans 1,4-structures. A product containing more than 80% of 1,2-vinyl double bonds in side positions is a particularly suitable starting material.

Isomeric mixtures of polybutadienes would generally be used, e.g. polybutadienes containing 30 to 90% of vinyl double bonds and 10 to 70% of mixtures of cis-1,4- and trans-1,4 double bonds. The polybutadienes may also carry functional groups, e.g. hydroxyl groups, carboxyl groups, etc. Polybutadienes of this type with different configurations are known; see e.g. "Makromoleküle" by H. G. Elias, 4th edition, publishers Hüthig and Wepf-Verlag, Basel, Heidelberg, and New York, pages 676 and 744–746 and 1012 etc.

The monomers and oligomers a–g are incorporated in the graft copolymer in substantially the same proportions in which they were used for polymerisation. The incorporated units may be in substantially random distribution.

Suitable solvents for the preparation of component A include, for example, aromatic solvents such as benzene, toluene, xylene or chlorobenzene, esters such as ethyl acetate, butyl acetate, methyl glycol acetate, ethyl glycol acetate, or methoxypropyl acetate, ethers such as butylglycol ether, tetrahydrofurane, dioxane, ethylglycol ether or diethyleneglycol dialkyl ethers, ketones such as acetone, methylethyl ketone or methylisobutyl ketone, and halogenated solvents such as methylene chloride or trichloromonofluoro ethane.

The preparation of graft polyacrylate resins A may be carried out continuously or batchwise. The monomer mixture and the initiator are generally dosed continuously and at a uniform rate into a polymerisation reactor and the corresponding quantity of polymer is at the same time continuously removed. Chemically virtually uniform copolymers may advantageously be produced by this method. Copolymers which are chemically almost uniform may also be produced by running the reaction mixture into a stirrer vessel at a constant velocity without discharging the polymer.

The graft copolymerisation is generally carried out at a temperature range of from 70° C. to 160° C., preferably from 100° C. to 150° C., at a pressure of $10^3$ to $2 \times 10^4$ mbar. The initiators are used in quantities of 0.05 to 15% by weight, based on the total quantity of monomers.

Suitable initiators for the preparation of the polyacrylate resins of component A include the usual radical starters, e.g. aliphatic azo compounds such as azodiisobutyric acid nitrile, azo-bis-2-methyl-valeronitrile, 1,1'-azo-bis-1-cyclohexane nitrile and 2,2'-azo-bisisobutyric acid alkyl esters; symmetrical diacyl peroxides, such as acetyl, propionyl or butyryl peroxide, benzoyl peroxides substituted with bromine, nitro, methyl or methoxy groups, and lauroyl peroxide; symmetrical peroxydicarbonates such as diethyl, diisopropyl, dicyclohexyl or dibenzoyl peroxydicarbonate; tert.-butyl peroctoate, t-butyl perbenzoate or tert-butylphenyl peracetate and peroxy carbonates such as tert-butyl-N-(phenylperoxy)-carbonate or tert-butyl-N-(2-,3- or 4-chloro-phenyl peroxy)-carbonate, hydroperoxides such as tert.-butylhydroperoxide, cumenehydroperoxide, and dialkylperoxides such as dicumylperoxide, tert.-butyl-cumyl-peroxide or di-tert.-butylperoxide.

The usual molecular weight regulators may be used for regulating the molecular weight of the acrylic resin of component A, e.g. n-dodecyl mercaptan, mercapto ethanol, diisopropyl xanthogen disulphide or di-(methylenetrimethylol propane)-xanthogen disulphide. Mercaptoethanol is preferred. The regulators are added in quantities of 0.1 to 10% by weight, based on the monomer mixture.

The flexibility of the coatings produced from the graft copolymerisation resins A according to the invention may be further increased with comparatively little loss of hardness by modifying the graft copolymerisation resins A with lactones, in particular with butyrolactone and ε-caprolactone.

The reaction of the graft copolymerisation resins A with the lactones is suitably carried out at temperatures of 100° C.–160° C. in the presence of catalysts, either after or during radical polymerisation. The catalysts used for the ring opening polymerisation of the lactones which takes place side by side with the radical polymerisation may be metal compounds, for example titanates or preferably organic tin compounds such as dibutyl tin oxide, dibutyl tin dilaurate, dibutyl tin diacetate, tin dioctoate, etc.

The catalysts are used in quantities of 0.01–0.2% by weight, based on the weight of the lactones put into the process.

Such lactone modifications may also be carried out by using lactone modified monomers for the preparation of the graft copolymer resins.

The polymer resins according to this invention are valuable binder components for 2-component lacquers. The term "two-component lacquers" is used in this context to include "one pot systems" and "two pot systems". Since the polymer resins according to the present invention are binder components for 2-component lacquers, the lacquers contain a hardening component in addition to the polymer resins according to the invention (and optionally other polyhydroxyl compounds). If the hardener is a polyisocyanate containing free isocyanate groups, for example, then the coating compounds must be made up ready for use shortly before they are to be applied by mixing the components together. Such a product would be a "two pot system". If, however, the hardener is a compound which will only react at an elevated temperature with the polymer resins according to the invention, e.g. polyisocyanates carrying blocked isocyanate groups, then the hardener may be combined with the polymer resin at room temperature to form a "one pot system" which can be stored at room temperature.

The reaction components B for the hydroxyl-containing graft copolymer resins according to the invention used for the preparation of lacquer binders for films and coatings may be crosslinking agents which harden the coatings according to this invention by chemical reactions with the hydroxyl-containing graft copolymer resins. Examples of such crosslinking agents include suitable melamine derivatives such as alkoxylated melamine resins or melamine-formaldehyde condensation products (e.g. FR-PS 943411, by D. H. Salomon in "The Chemistry of Organic Film formers", pages 235-240, John Wiley & Sons, Inc., New York, 1974) as well as conventional crosslinking agents such as epoxides which are capable of reacting with alcoholic hydroxyl groups, carboxylic acid anhydrides, phenoplast resins, resol resins, urea resins, guanidine resins or mixtures thereof.

Conventional commercially available lacquer polyisocyanates (e.g. U.S. Pat. Nos. 3,124,605, 3,358,010, 3,903,126, 3,903,127, 3,976,622, 3,183,112, 3,394,111, 3,645,979, and 3,919,218; GB-PS Nos. 1060430, 1234972 and 1458564) such as lacquer polyisocyanates which contain biuret groups, urethane groups, allophanate groups or isocyanurate groups are preferred reactants B for the OH-functional graft copolymer resins according to the invention used for the preparation of lacquer binders for films and coatings.

The polyisocyanates containing urethane groups are preferably adducts of aliphatic triols and tetraols, e.g. trimethylol propane, glycerol, pentaerythritol and aromatic or cycloaliphatic diisocyanates such as 2,4- and/or 2,6-toluylene diisocyanate, 2,4'- and/or 4,4'- diisocyanatodicyclohexyl methane, isophorone diisocyanate, etc. One hydroxyl group of the polyol generally reacts with one mol of diisocyanate.

The polyisocyanates containing isocyanurate groups may be cyclotrimerisation products of the above mentioned aliphatic and aromatic diisocyanates, in particular of tolylene diisocyanate and hexamethylene diisocyanate.

The hydroxyl-containing graft copolymer resins and the polyisocyanates used for crosslinking are put into the process in the proportions required to provide from 0.5 to 2, preferably 0.7 to 1.3 isocyanate groups to one hydroxyl group.

The usual auxiliary agents and additives used in lacquer technology may be added when the products are used for the purpose according to this invention, e.g. solvents, pigments, viscosity regulating substances, antifoamants, catalysts for the NCO/OH addition reaction, UV absorbents, antioxidants and other substances which prevent degradation of the polymer, e.g. sterically hindered amines, etc.

When polyisocyanates are used as crosslinking agents, the coating compounds according to this invention are preferably cured at temperatures of 0° C. to 130° C. The coatings obtained under these conditions combine very high stretchability with great hardness and excellent resistance to weathering and chemical resistance.

They are therefore particularly suitable for coating articles which are exposed to weathering, e.g. metallic objects such as motor vehicles, roof gutters, railings, bicycles, domestic appliances, etc.

The lacquers are applied by the usual methods such as spraying, casting, immersion, spread coating, spraying or roller application. The lacquers are generally used in the quantities required to produce dry film thicknesses of the lacquers of 0.005 to 0.1 mm.

EXAMPLES

All percentages given are percentages by weight and all "parts" are parts by weight.

EXAMPLES 1-7, 8a, 9a, V1 AND V2

The quantity of solvent shown in Table I is introduced into a reactor equipped with reflux condenser and heating, cooling and dosing devices and heated to 120° C. A mixture of the monomer indicated in Table I and the molecular weight regulator is added at this temperature under a nitrogen atmosphere in the course of 2 hours. At the same time, the initiator indicated in Table I dissolved in the given quantity of solvent is added separately in the course of 2.5 hours.

The reaction mixture is then stirred for 3 hours at 120° C. and the polymer is removed by pressure filtration. The characteristic data of graft copolymer resins 1-9 and comparison examples V1 and V2 are shown in Table II.

EXAMPLES 8b AND 9b 800 parts of 8a or 9a, respectively, 160 parts of ε-caprolactone and 0.1 part of tin dioctoate are stirred together for 6 hours at 130° C. in a reaction vessel equipped with reflux condenser. The resulting product is then removed by pressure filtration.

The quantities given in Table I are parts by weight.

TABLE I

| | Example | | | | | | | | | | |
|---|---|---|---|---|---|---|---|---|---|---|---|
| | 1 | 2 | 3 | 4 | 5 | 6 | 7 | 8a | 9a | V1 | V2 |
| Xylene | 900 | 900 | 900 | 700 | 700 | 600 | 600 | 700 | 700 | 600 | 600 |
| Polybutadiene Nisso G-1000[(1)R] | 195 | 195 | 195 | 175 | 175 | | | 175 | 117 | | |
| Polybutadiene Lithene PL[(2)R] | | | | | | 189 | 189 | | | | |
| Styrene | 98 | | | 130 | 120 | 139 | 120 | 130 | 187 | 124 | 190 |
| Methylmethacrylate | | 98 | | | | | | | | 124 | |
| Butylacrylate | 453 | 453 | 448 | 578 | 533 | 622 | 571 | 481 | 481 | 674 | 480 |
| 2-Ethylhexylacrylate | | | 97 | | | | | | | | 252 |
| 2-Hydroxyethylacrylate | 220 | 220 | 220 | 270 | | 292 | | 363 | 365 | 327 | 327 |
| Butanediolmonoacrylate | | | | | 325 | | 362 | | | | |
| Acrylic acid | 10 | 10 | 10 | 12 | 12 | 13 | 13 | 16 | 16 | 12 | 12 |
| Mercaptoethanol | 30 | 30 | 36 | 43 | 43 | 46 | 46 | 43 | 36 | | |
| t-Butylperoxy-2-ethylhexanoate | 14 | 14 | 14 | 17 | 17 | 19 | 19 | 17 | 26 | 49 | 49 |

TABLE I-continued

| | Example | | | | | | | | | | |
|---|---|---|---|---|---|---|---|---|---|---|---|
| | 1 | 2 | 3 | 4 | 5 | 6 | 7 | 8a | 9a | V1 | V2 |
| Xylene | 80 | 80 | 80 | 75 | 75 | 80 | 80 | 75 | 72 | 90 | 90 |

(1)Molecular weight about 1,400, OH content about 2.5%, >90% 1,2-vinyl double bonds
(2)Molecular weight about 900, 40–50% 1,2-vinyl double bond, 30–40% 1,4-trans-double bonds, 15–25% 1,4-cis-double bonds.

TABLE II

| | Example | | | | | | | | | | | | |
|---|---|---|---|---|---|---|---|---|---|---|---|---|---|
| | 1 | 2 | 3 | 4 | 5 | 6 | 7 | 8a | 8b | 9a | 9b | V1 | V2 |
| Solids content (%)(1) | 49.4 | 50.2 | 50.3 | 60.1 | 60.3 | 65.4 | 65.6 | 60.4 | 65.3 | 59.8 | 66.5 | 65.9 | 65.3 |
| Viscosity (20° C.) (mPa.s) | 1079 | 831 | 911 | 2853 | 2016 | 1923 | 1598 | 2580 | 2941 | 1300 | 1494 | 1360 | 1610 |
| Acid number (mg KOH/g of substance) | 4 | 4 | 4 | 5 | 5 | 5 | 5 | 6 | 5 | 6 | 5 | 5 | 5 |
| Hydroxyl number (mg KOH/g of substance) | 71 | 72 | 74 | 88 | 86 | 87 | 87 | 110 | 90 | 108 | 292 | 79 | 80 |
| Colour number (APHA)* | 70 | 50 | 40 | 10 | 15 | 50 | 60 | 10 | 30 | 10 | 35 | 45 | 15 |

(1)% by weight of non-volatile constituents

Results of tests carried out on white lacquers prepared by the new graft copolymerisation resins and the comparison examples according to the following formulation.

| % by weight of solvent free constituents |
|---|
| 44.4 graft copolymer resin or comparison example |
| 0.1 zinc octoate |
| 1.2 tinuvin 900[1] |
| 0.6 bentone 38[2] |
| 36.8 titanium dioxide (Kronos 2160) |
| 16.9 Desmodur N (hexamethylene diisocyanate biuret) |
| 100.0 |

Solids contents of substances worked up: 46% by weight in a 54% by weight solvent mixture of xylene, methoxypropylacetate, ethyl acetate and methylethyl ketone.

[1] ® Tinuvin 900:

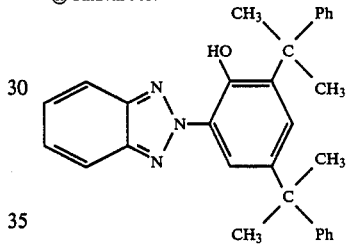

UV absorbent, dialkyl-substituted hydroxyphenyl triazole, Ciba Geigy
® Bentone 38: Laminated magnesium sillicate of Kronos Titan GmbH.

| | Example | | | | | | | | | | |
|---|---|---|---|---|---|---|---|---|---|---|---|
| | 1 | 2 | 3 | 4 | 5 | 6 | 7 | 8b | 9b | V1 | V2 |
| Storage time at room temperature (h) approx. | 2.8 | 4.4 | 4.4 | 14.4 | 12.8 | 15.8 | 13.6 | 2.7 | 7.1 | 22 | 14.7 |
| Drying time rec. (h) approx. | 3.6 | 3.7 | 3.0 | 5.6 | 3.9 | 5.3 | 3.5 | 2.3 | 2.4 | 7.1 | 2.3 |
| Gloss (60° Gardner) | 86 | 85 | 84 | 92 | 93 | 93 | 92 | 91 | 93 | 90 | 92 |
| Pendulum hardness (after 14 days) | 105 | 123 | 98 | 137 | 122 | 90 | 88 | 76 | 78 | 104 | 77 |
| Solvated by* (1 Min. action) | | | | | | | | | | | |
| Toluene | 0 | 0 | 0 | 0 | 0 | 1 | 0 | 0 | 0 | 2 | 1 |
| MPA | 0 | 0 | 0 | 0 | 0 | 0 | 0 | 0 | 0 | 1 | 1 |
| EA | 1 | 1 | 1 | 0 | 0 | 1 | 1 | 1 | 0 | 3 | 2 |
| Acetone | 2 | 2 | 2 | 0 | 1 | 2 | 1 | 1-2 | 1 | 3 | 2 |
| Tar resistance* Action of DB tar solution | | | | | | | | | | | |
| 1 h | 0 | 0 | 0 | 0 | 0 | 0 | 0 | 0 | 0 | 1 | 1 |
| 3 h | 0 | 0 | 0 | 0 | 0 | 0 | 0 | 1 | 1 | 1 | 1 |
| 24 h | 1 | 0-1 | 1 | 0 | 1 | 1 | 1 | 1 | 1 | 2 | 2 |
| Bending test 1 inch* (on Bayflex 91) | | | | | | | | | | | |
| 0° C. | + | + | + | + | + | + | + | + | + | + | + |
| −5° C. | + | + | + | + | + | + | + | + | + | + | |
| −10° C. | + | + | + | + | + | + | + | + | + | − | + |
| −15° C. | + | + | + | + | + | + | + | + | + | − | − |
| −20° C. | + | + | + | + | + | + | + | + | + | − | − |
| −25° C. | − | − | − | − | + | − | + | + | + | − | − |
| −30° C. | − | − | − | − | − | − | − | + | + | − | − |

1 Inch: 2.54 × 10$^{-2}$ m

*0 = best possible result
4 = least favourable result
MPA = methoxypropyl acetate
EA = ethyl acetate
DB tar solution = solution of tar in organic solvents (Daimler Benz)
(R)Bayflex 91 = PUR integral foam (Bayer AG)
APHA = unit of measurement of colour number according to Hazen

METHOD OF CARRYING OUT BENDING TEST

A Bayflex work piece measuring 3 mm in thickness, 15 mm in width and 100 mm in length and lacquer coated with white lacquers 1 to 9 and V1 and V2 is placed on a mandrel 1 inch in diameter ($2.54 \times 10^{-2}$ m). The lacquered workpiece is then bent through 180° over the mandrel.

Results:
+: coating undamaged
−: coating cracked.

We claim:

1. Binder combinations comprising
   (A) 99–30 parts by weight of OH-functional graft copolymer resins prepared by the copolymerization of
      (a) 1 to 60 parts by weight of at least one polybutadiene having a molecular weight of from 500 to 10,000 and containing more than 30% of a 1,2-vinyl structure,
      (b) 5 to 60 parts by weight of at least one unsaturated aromatic monomer comprising styrene, vinyl toluene, or methacrylic acid ester containing aliphatic $C_1$–$C_6$ hydrocarbon groups,
      (c) 5 to 80 parts by weight of at least one aliphatic acrylic acid ester containing 1 to 12 carbon atoms in the alcohol component,
      (d) 10 to 60 parts by weight of at least one hydroxyalkyl ester of acrylic or methacrylic acid containing 2–8 carbon atoms in the hydroxyalkyl group,
      (e) 0 to 50 parts by weight of at least one acrylic or methacrylic acid glycidyl ester or reaction products thereof with aliphatic or aromatic monocarboxylic acids and amino compounds,
      (f) 0 to 30 parts by weight of acrylonitrile and,
      (g) 0.05 to 10 parts by weight of at least one $\alpha,\beta$-monoolefinically unsaturated mono or dicarboxylic acid containing 3 to 7 carbon atoms, at least one maleic acid or fumaric acid semi ester containing 2 to 14 carbon atoms in the alcohol group, or both and
   (B) 1 to 70 parts by weight of a multi-functional crosslinking resin, the sum of parts by weight of components (A) and (B) and the sum of parts by weight of components (a) to (g) amounting in each case to 100.

2. Binder combinations according to claim 1, characterized in that component (A) consists of
   (a) 1 to 55 parts by weight of one or more functional or non-functional polybutadienes having a molecular weight of from 500 to 10,000 and containing more than 35% of a 1,2-vinyl structure,
   (b) 5 to 55 parts by weight of styrene, vinyl toluene, methylmethacrylate, butylmethacrylate or mixtures thereof,
   (c) 5 to 75 parts by weight of ethyl acrylate, butyl acrylate, 2-ethyl-hexyl acrylate or mixtures thereof,
   (d) 10 to 55 parts by weight of 2-hydroxyethyl acrylate, 2-hydroxy propyl acrylate, 4-hydroxy butyl acrylate, 2-hydroxy ethyl methacrylate, 2-hydroxy propyl methacrylate or mixtures thereof,
   (e) 0 to 45 parts by weight of glycidyl acrylate, glycidyl methacrylate or mixtures thereof,
   (f) 0 to 25 parts by weight of acrylonitrile, and
   (g) 0.1 to 8 parts by weight of acrylic acid, methacrylic acid or maleic acid semi ester containing 4 to 8 carbon atoms in the alcohol component or mixtures thereof.

3. Binder combinations according to claim 1, characterized in that the OH-functional monomer of the component (A) is an adduct of at least one monoester of acrylic or methacrylic acid with an alkane diol containing 2 to 4 carbon atoms and ε-caprolactone in a molar ratio of from 1.5:1 to 1:3.

4. Binder combinations according to claim 1, characterized in that the component (A) is modified with ε-caprolactone during or after graft polymerisation.

5. Binder combinations according to claim 1, characterized in that the multi-functional crosslinking resin B is an aminoplast resin.

6. Binder combinations according to claim 1, characterized in that the multi-functional crosslinking resin B is an alkoxylated melamine resin, a melamine-formaldehyde condensation product, a urea resin, a guanidine resin or mixtures thereof.

7. Binder combinations according to claim 1, characterized in that the multi-functional crosslinking resin B is a resol resin.

8. Binder combinations according to claim 1, characterized in that the multi-functional crosslinking resin is a polyisocyanate.

9. Binder combinations according to claim 1 wherein component (A) is 90–30 parts by weight.

10. Binder combinations according to claim 1 wherein component (B) is 10–70 parts by weight.

* * * * *